United States Patent [19]

Horiuchi et al.

[11] 4,290,907

[45] Sep. 22, 1981

[54] PROCESS FOR TREATING RADIOACTIVE WASTE

[75] Inventors: Susumu Horiuchi; Mikio Hirano, both of Hitachi; Hideo Yusa, Katsuta; Koichi Chino; Tatsuo Hayashi, both of Hitachi, all of Japan

[73] Assignee: Hitachi, Ltd., Tokyo, Japan

[21] Appl. No.: 963,119

[22] Filed: Nov. 22, 1978

[30] Foreign Application Priority Data

Nov. 28, 1977 [JP] Japan .................................. 52/142417

[51] Int. Cl.³ .................................................. G21F 9/30
[52] U.S. Cl. ............................................... 252/301.1 W
[58] Field of Search .................................. 252/301.1 W

[56] References Cited

U.S. PATENT DOCUMENTS 3,838,061 9/1974 Cuaz et al. .................. 252/301.1 W
4,033,868 7/1977 Meichsner et al. ......... 252/301.1 W

FOREIGN PATENT DOCUMENTS 52-94866 9/1977 Japan .

Primary Examiner—Deborah L. Kyle
Attorney, Agent, or Firm—Craig and Antonelli

[57] ABSTRACT

Granular ion exchange resins in a desalter provided in a nuclear power plant are taken out from the desalter as used ion exchange resins when their capacities are lowered. The used ion exchange resins in a slurry state are led to a thin film drier. A rotating shaft provided with rotating blades is inserted in the thin film drier. When the slurry of the used ion exchange resins is led thereto, the rotating shaft is driven to rotate, and the side wall of the thin film drier is heated. The used ion exchange resins led to the thin film drier are heated and pulverized to powder by the action of rotating blades. The powder is taken out of the thin film drier to the outside and shaped into pellets.

5 Claims, 3 Drawing Figures

PROCESS FOR TREATING RADIOACTIVE WASTE

BACKGROUND OF THE INVENTION

This invention relates to a process for treating a radioactive waste, and more particularly to a process for treating a radioactive waste suitable for pulverizing solid matters discharged from a nuclear power plant, such as used ion exchange resins, etc. to powder.

Among solid wastes discharged from radioactive material-handling facility such as nuclear power plant, etc., solid wastes having a particularly high radioactive level are used filter aids and used granular ion exchange resins. The filter aids include cellulose and powdery resins. Since the ultimate procedure for treating the radioactive wastes have not been finalized yet, the used filter aids and used granular ion exchange resins are stored in a slurry state in storage tanks in the nuclear power plant. Storage of such radioactive waste in the slurry state causes serious problems such as corrosion of storage tank walls, etc., making it difficult to store the used filter aids and granular ion exchange resins for a prolonged period of time. Furthermore, tanks of large capacity are required for such storage of the solid radioactive wastes.

Study has been made to store the used filter aids and granular ion exchange resins in a more stable state. Since the filter aids and granular ion exchange resins are combustible, it has been tried to burn the used filter aids and granular ion exchange resins to reduce their volumes. However, the used filter aids and granular ion exchange resins contain much water inside, and thus their combustion is hard to make. When the used filter aids and granular ion exchange resins are burned, a filter is necessary for removing the radioactive materials contained in the resulting combustion gas as a flue gas. The filter must be more often exchanged with a new one, and a treatment of the used filter is required, and such treatment also produces a secondary radioactive waste. Thus, it is desirable to fill the used filter aids or used granular ion exchange resins in a drum and solidify them in the drum by means of cement, asphalt or plastics. However, in such procedure, the used filter aids or granular ion exchange resins keep the original shapes as filled in the drum, and a satisfactory volume reduction cannot be obtained.

SUMMARY OF THE INVENTION

An object of the present invention is to reduce a volume of solidified mass of radioactive materials discharged from a radioactive material-handling facility.

Another object of the present invention is to reduce a volume of solidified mass of radioactive insoluble materials discharged from a radioactive material-handling facility.

Other object of the present invention is to increase a volume reduction of the radioactive, insoluble materials.

The present invention is characterized by supplying radioactive, insoluble materials discharged from a radioactive materials-handling facility into a shell with rotating blades provided therein, heating the insoluble materials in the shell, and rotating the rotating blades, thereby pulverizing the insoluble materials to powder. Preferably, the resulting powder of the insoluble materials is shaped into pellets.

DESCRIPTION OF THE PREFERRED EMBODIMENTS

The present invention is based on such an experimental result that, when a slurry of used filter aids or granular ion exchange resins and water is dried in a thin film drier, dried powder having definite sizes can be formed, irrespectively of the sizes of the used filter aids or granular ion exchange resins. The experimental results are described below:

Cellulose, powdery resins or granular ion exchange resins is supplied separately to a thin film drier having a heat transfer area of 0.3 m$^2$, and the shell of the thin film drier is heated by steam at 160° C. A rotating shaft with rotating blades, inserted in the thin film drier, is rotated. When a feed rate to the thin film drier is 30 kg/hr or less for the cellulose, 30 kg/hr or less for the powdery resins, and 35 kg/hr or less for the granular ion exchange resins, the cellulose, powdery resins, and the granular ion exchange resins can be pulverized to powder, respectively. Though the average particle sizes of cellulose and powdery resins are about 50μ and those of the granular ion exchange resins are about 200μ, the powder formed in the thin film drier can have an average particle size of about 10μ in every cases. In the experiment, any formation of decomposition products by heating is not observed at all in every cases. The cellulose, the powdery resins and the granular ion exchange resins are all insoluble in water.

One preferable embodiment of the present invention applied to a treatment of used granular ion exchange resins discharged from a power plant of boiling water type, nuclear reactor will be described, referring to FIGS. 1 and 2.

Figure 1:
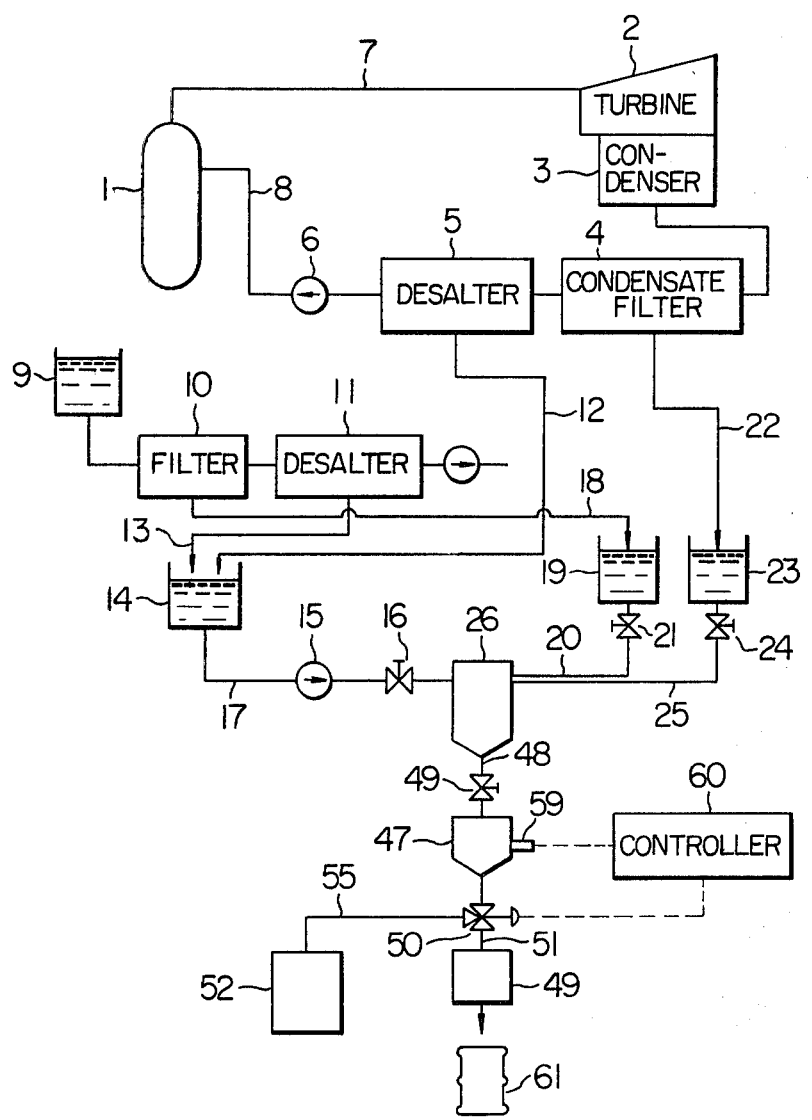
FIG. 1 is a flow diagram showing one of preferable embodiments of the present invention, that is, an apparatus for treating radioactive wastes, to which the present process for treating the radioactive wastes is applied.

In FIG. 1, steam generated from a nuclear reactor 1 is led to a turbine 2 through a main steam line 7, and then condensed in a condenser 3. Condensed water from the condenser 3 is freed of solid matters such as clads, etc. by a condensate filter 4 and freed of ions by a desalter 5 and purified. Then, the purified condensed water is pressurized by a feed water pump 6 and returned to the nuclear reactor 1 through a feed water line 8.

Machinery drains formed in the power plant of boiling water type nuclear reactor are stored in a collector tank 9 and purified by a filter 10 and a desalter 11. The desalters 5 and 11 are communicated to a tank 14 through lines 12 and 13, respectively. Granular ion exchange resins are filled in the desalters 5 and 11. A line 17 connected to the tank 14 is connected to a thin film drier 26 through a pump 15 and a valve 16. The filter 10 is communicated to a tank 19 through a line 18. Filter medium whose surface is precoated with cellulose particles is placed in the filter 10. Line 20 connected to the tank 19 is connected to the thin film drier 26 through a valve 21. The condensate filter 4, in which a filter medium whose surface is precoated with powdery resins is placed, is communicated to a tank 23 through a line 22. A line 25 connects the tank 23 to the thin film drier 26. A valve 24 is provided on line 25.

Figure 2:
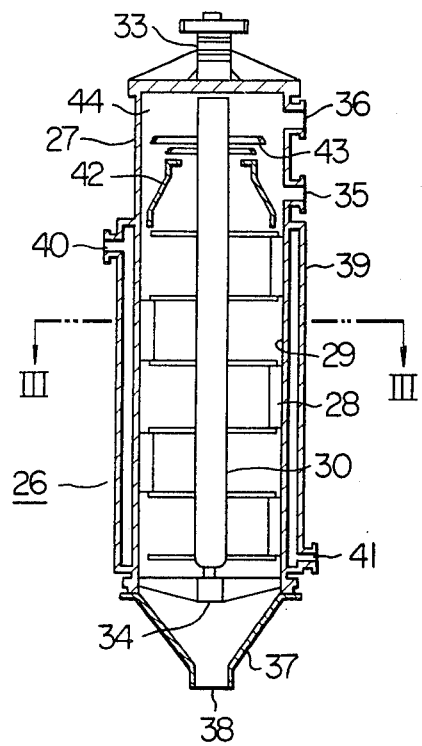
FIG. 2 is a vertical cross-sectional view of a thin film drier applicable to the apparatus of FIG. 1.
Figure 3:
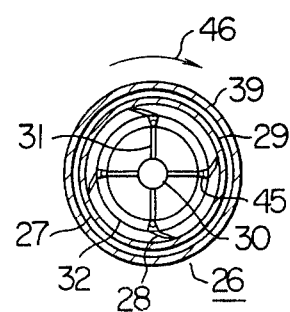
FIG. 3 is a cross-sectional view along the line III—III of FIG. 2.

The structure of the thin film drier is described in detail, referring to FIGS. 2 and 3. The thin film drier 26 is provided with a rotating shaft 30 with rotating blades 28 in a shell 27 of the drier. The rotating shaft is supported at an upper bearing 33 and a lower bearing 34, and a vapor outlet 36 and a feed inlet 35 are provided at the upper part of the shell. The lines 17, 20 and 25 are connected to the feed inlet 35. A bottom cone 37 with a powder outlet 38 is provided at the lower part of the shell 27. A mist separator 43 and a distributor 42 are provided at the upper part in the shell 27 to form a vapor compartment 44. A jacket 39 is provided around the shell 27, and further provided with a heating medium inlet 40 and a heating medium outlet 41. The rotating blades 28 are fixed by pins 45 to support rings 32 to be fixed to the rotating shaft 30 by support arms 31.

A line 48 connected to the powder outlet 38 of the thin film drier 26 is connected to a hopper 47 through a valve 49. A line 51 connects the bottom of the hopper 51 to a pelletizer 49. A three-way valve 50 is provided on the line 51. One end of line 55 is fixed to the three-way valve 50 and other end of the line 55 is connected to a tank 52. A moisture detector 59 is provided at the hopper 47. Numeral 60 is a controller.

Granular ion exchange resins having a decreased capacity in the desalters 5 and 11 are introduced in a slurry state as used granular ion exchange resins into the tank through the lines 12 and 13. Powdery resins having a decreased capacity in the condensate filter 4 are removed from the surface of the filter medium, and introduced in a slurry state into the tank 23 through the line 22. Cellulose having a decreased capacity in the filter 10 is removed from the surface of the filter medium and introduced in a slurry state into the tank 19 through the line 18.

By opening the valve 16 and driving the pump 15, the slurry of the granular ion exchange resins in the tank 14 is supplied into the thin film drier 26. A concentration of the granular ion exchange resins in the slurry is 5% by weight. If the concentration of the granular ion exchange resins exceeds 5% by weight, there will be a fear of clogging the line 17, etc.

The used ion exchange resins containing radioactive materials, which will be hereinafter referred to merely as a feed, is fed into the shell 27 at the feed inlet 35, and uniformly distributed in a circumferential direction by the distributor 42, and flows down along the inside surface of the shell 27 by gravity. The rotating shaft 30 is in a rotating motion. The descending feed is pressed to the inside surface of the shell 27 by the centrifugal force developed by rotation of the rotating blades 28 provided at the rotating shaft 30 in an arrow direction 46. Steam at 7 atmospheres gage is supplied from the heating medium inlet 40 into an annular space formed between the shell 27 and the jacket 39. Steam flows out at the heating medium outlet 41. The wall surface of the shell 27 surrounded by the jacket 39 is heated by the steam, and the wall surface is a heat transfer surface 29. As the feed flows down along the heat transfer surface 29, water is evaporated from the feed. The generated water vapor passes through the vapor compartment 44 and flows out at the vapor outlet 36. The used granular ion exchange resins are pulverized to powder by the rotation of rotating blades 28. Powder of the granular ion exchange resins is discharged from the thin film drier at the powder outlet 38 and led to the hopper 47.

Pulverization of the granular ion exchange resins is carried out between the heat transfer surface 39 and the rotating blades 28. The powder in the hopper 47 is measured by the moisture detector 59 to determine a moisture content of the powder. If the moisture content of the powder is less than predetermined value, the three-way valve 50 is operated by the action of controller 60 to connect the hopper 47 to the pelletizer 49. A valve (not shown in FIG. 1) is provided on the line 51 at the downstream side of the three-way valve 50, and is also made open. The powder is led from the hopper 47 to the pelletizer 49 and shaped into pellets in the pelletizer 49. However, only in the case of the powders of the granular ion exchange resins, no pellets are formed as such, and thus a binder is added to the tank 14 and the pellets can be shaped by the action of the binder. The pellets are filled in a drum 61, and asphalt is filled in the drum 61 filled with the pellets. After the asphalt is solidified, the drum 61 is sealed and a solidified mass of the granular ion exchange resins is obtained thereby.

When the moisture content of the powder in the hopper 47 is higher than the predetermined value, the hopper 47 is connected to the pipe 55 by the action of controller 60 to discharge the powder in the hopper 47 into the tank 52. After the completion of discharging the powder from the hopper 47, the thin film drier 26 is again put in operation to make powder.

Assuming that the density of the resulting pellets is 1.5 g/cm$^3$ and taking into account clearances among the pellets, 160 kg of the used granular ion exchange resins can be filled in one drum having a net volume of 200 l. According to the present embodiment, the voids in the granular ion exchange resins can be eliminated by pulverizing the granular ion exchange resins and immediately pelletizing the resulting powder, and thus an amount to be filled in the drum can be 30% increased, as compared with the amount of the granular ion exchange resins when directly mixed with the asphalt and filled in the drum.

Even if other procedures than by asphalt solidification, for example, those by plastic solidification and cement solidification, are formally finalized as the ultimate procedure for treating the radioactive wastes, the present embodiment can be readily applied thereto by pulverizing the granular ion exchange resins as described above. For example, in the case of plastic solidification, the powder is shaped into pellets, and a plastic is poured into a drum filled with the pellets. When the cement solidification is employed as the ultimate procedure, the powder of the granular ion exchange resins produced in the thin film drier 26, is mixed with cement, and the resulting mixture is poured into a drum.

In the cases of the asphalt solidification and plastic solidification, the powder of granular ion exchange resins can be mixed with asphalt or plastic and solidified with shaping the powder into pellets. A larger volume reduction than the conventional one can be obtained by pulverizing the granular ion exchange resins. In that case, the volume reduction is made smaller than that when shaped into pellets.

In the foregoing, an embodiment of pulverizing the granular ion exchange resins by a thin film drier has been shown, but the process of pulverization is carried out between the heat transfer surface and the rotating blades, and thus a rotary kiln in which rotating blades can contact the heat transfer surface can be used in place of the thin film drier. However, more effective heat transfer area is available in the thin film drier, and thus a compact apparatus can be obtained in the case of the thin film drier, when the granular ion exchange resins are treated at the same rate.

Since the pulverization is carried out by pressing the granular ion exchange resins to the heat transfer surface by means of the rotating blades, a load can be applied to the resins, even if there is a clearance between the rotating blades that rotate in a liquid-free state and the heat transfer surface, so long as the size of the clearance is not larger than the diameter of the granular ion exchange resins to be treated. Even if the size of the clearance is larger than the diameter of the granular ion exchange resins, the ion exchange resins are attached and solidified to the heat transfer surface and a load of the blades is applied to the granular ion exchange resins on the heat transfer surface, thereby making pulverization.

A slurry of the cellulose in the tank 19 can be supplied to the thin film drier 26 by opening the valve 21, or a slurry of the powdery resins in the tank 23 can be supplied to the thin film drier 26 by opening the valve 24, and the cellulose or the powdery resins can be pulverized to powder in the same manner as in the case of the granular ion exchange resins. Powder of cellulose or powdery resins can be pelletized alone, and thus it is not necessary to add a binder thereto in contrast to the granular ion exchange resins. Thus, the amount of the waste is never increased, as compared with that of the granular ion exchange resins.

The present invention can be applied to treatments of insoluble materials discharged from other nuclear power plants than that of boiling water type nuclear reactor, and such radioactive material-handling facility as a nuclear fuel-reprocessing plant, etc.

According to the present invention, a volume of the insoluble materials can be considerably reduced, and thus a solid mass of radioactive materials discharged from the radioactive material-handling facility can be decreased.

What is claimed is:

1. A process for treating a granular radioactive waste, which comprises:

supplying an aqueous slurry of a used radioactive granular, water-insoluble, ion exchange resin discharged from a radioactive material-handling facility into a thin film drier including a shell equipped with a heated wall surface and a rotating shaft having blades that pass closely adjacent to said heated wall surface, and pressing the radioactive granular, water-insoluble ion exchange resin onto the heated wall surface by moving said blades past said heated wall surface with rotation of said rotating shaft, thereby pulverizing the radioactive granular, water-insoluble, ion exchange resin into a powder.

2. A process according to claim 1, wherein the radioactive granular ion exchange resin is supplied into a centrifugal film drier and pulverized therein.

3. A process according to claim 1, wherein the resulting powder is filled into a vessel and then a solidifying agent is poured into the vessel and solidified therein.

4. A process according to claim 1, wherein the resulting powder is admixed with a binder and then shaped into said pellets.

5. A process according to claim 4, wherein the pellets are filled in a vessel, and then a solidifying agent is poured into the vessel and solidified therein.

* * * * *